(12) United States Patent
Brothers, III et al.

(10) Patent No.: US 12,061,967 B2
(45) Date of Patent: Aug. 13, 2024

(54) PROCESSING DATA FOR A LAYER OF A NEURAL NETWORK

(71) Applicant: Arm Limited, Cambridgeshire (GB)

(72) Inventors: John Wakefield Brothers, III, Calistoga, CA (US); Kartikeya Bhardwaj, San Jose, CA (US); Alexander Eugene Chalfin, Mountain View, CA (US); Danny Daysang Loh, Menlo Park, CA (US)

(73) Assignee: Arm Limited, Cambridge (GB)

( * ) Notice: Subject to any disclaimer, the term of this patent is extended or adjusted under 35 U.S.C. 154(b) by 903 days.

(21) Appl. No.: 17/132,750

(22) Filed: Dec. 23, 2020

(65) Prior Publication Data

US 2022/0198243 A1 Jun. 23, 2022

(51) Int. Cl.
*G06N 3/0464* (2023.01)
*G06N 3/04* (2023.01)
*G06N 3/08* (2023.01)

(52) U.S. Cl.
CPC ............. *G06N 3/04* (2013.01); *G06N 3/0464* (2023.01); *G06N 3/08* (2013.01)

(58) Field of Classification Search
CPC ........... G06N 3/04; G06N 3/08; G06N 3/0464
See application file for complete search history.

(56) References Cited

U.S. PATENT DOCUMENTS

| 10,282,864 | B1 * | 5/2019 | Kim | ................. | G06T 9/002 |
|---|---|---|---|---|---|
| 2019/0164037 | A1 * | 5/2019 | Kim | ................. | G06N 3/04 |
| 2020/0233803 | A1 * | 7/2020 | Vengallur | ............. | G06N 3/045 |
| 2020/0349432 | A1 * | 11/2020 | Brothers | ............... | G06N 3/045 |
| 2021/0287083 | A1 * | 9/2021 | Bharadwaj | ............... | G06N 3/08 |
| 2022/0012587 | A1 * | 1/2022 | Kong | .................... | G06N 3/045 |
| 2023/0128432 | A1 * | 4/2023 | Yeh | .................. | G06F 18/24133 |
| | | | | | 382/181 |

OTHER PUBLICATIONS

Jia, Yangqing, "Caffe—Deep learning framework", Berkeley AI Research, Aug. 25, 2020, caffe.berkeleyvision.org/tutorial/layers/convolution.html.

* cited by examiner

*Primary Examiner* — Beau D Spratt
(74) *Attorney, Agent, or Firm* — EIP US LLP (57) ABSTRACT

A method of processing input data for a given layer of a neural network using a data processing system comprising compute resources for performing convolutional computations is described. The input data comprises a given set of input feature maps, IFMs, and a given set of filters. The method comprises generating a set of part-IFMs including pluralities of part-IFMs which correspond to respective IFMs, of the given set of IFMs. The method further includes grouping part-IFMs in the set of part-IFMs into a set of selections of part-IFMs. The method further includes convolving, by respective compute resources of the data processing system, the set of selections with the given set of filters to compute a set of part-output feature maps. A data processing system for processing input data for a given layer of a neural network is also described.

16 Claims, 7 Drawing Sheets

PROCESSING DATA FOR A LAYER OF A NEURAL NETWORK

BACKGROUND OF THE INVENTION

Field of the Invention

The present disclosure relates to processing data. In particular, but not exclusively, the present disclosure relates to processing input data for a layer of a neural network using a data processing system comprising a plurality of compute resources.

Description of the Related Technology

Neural networks have emerged as powerful tools for image processing, inference, machine learning, and related tasks. Neural networks may include one or more convolutional layers. For example, convolutional neural networks (CNNs) typically include multiple convolutional layers. In a convolutional layer, an output data array, referred to as an output feature map (OFM), is computed via convolutions between an input data array, referred to as an input feature map (IFM), and one or more filters, also referred to as kernels. Each output feature map contains multiple elements, where each element is computed via a series of convolutional computations, between a subset of elements of the data array and respective weight values of a kernel. Neural networks may also comprise other layer types, for example, Fully Connected (FC) layers, Deconvolution layers, Recurrent layers, and so forth.

The convolutional computations account for a significant portion of the computational cost of performing inference or training for a neural network, both in terms of processing time and in terms of power required to switch bits within registers. Since these computations are performed repeatedly during inference or training, specialized integrated circuits called hardware accelerators have been developed.

A neural processing unit (NPU) is a hardware accelerator which is specialized for processing data in accordance with neural networks, for example, convolutional neural networks (CNN). An NPU may also be referred to as a neural network accelerator (NNA), a convolutional neural network accelerator (CNNA), a machine learning accelerator, or an artificial intelligence accelerator. An NPU includes an array of specialized convolution engines (CEs), which each contain for example multiply-accumulate (MAC) hardware to perform convolutional operations.

SUMMARY

According to a first aspect, there is provided method of processing input data for a given layer of a neural network using a data processing system comprising compute resources for performing convolutional computations, the input data comprising a given set of input feature maps, IFMs, and a given set of filters. The method comprises performing a compute-performance-improvement method of processing the input data for the given layer including: generating a set of part-IFMs including a first plurality of part-IFMs which correspond to a first IFM, of the given set of IFMs and a second plurality of part-IFMs which correspond to a second IFM, of the given set of IFMs. The method further includes grouping part-IFMs in the set of part-IFMs into a set of selections of part-IFMs, including: selecting at least a first part-IFM from the first plurality of part-IFMs and a second part-IFM from the second plurality of part-IFMs to form a first selection of part-IFMs, and selecting at least a third part-IFM from the first plurality of part-IFMs and a fourth part-IFM from the second plurality of part-IFMs to form a second selection of part-IFMs. The method further includes convolving, by respective compute resources of the data processing system, the set of selections with the given set of filters to compute a set of part-output feature maps, part-OFMs.

According to a second aspect, there is provided a data processing system. The data processing system comprises a plurality of compute resources and storage for storing data according to a layer of a neural network. The data comprises a set of input feature maps, IFMs, and a set of filters. The storage element is coupled to the data processing system. The data processing system is configured to generate a set of part-IFMs including a first plurality of part-IFMs which correspond to a first IFM, of the given set of IFMs and a second plurality of part-IFMs which correspond to a second IFM, of the given set of IFMs. The data processing system is further configured to group part-IFMs in the set of part-IFMs into a set of selections of part-IFMs, including selecting at least a first part-IFM from the first plurality of part-IFMs and a second part-IFM from the second plurality of part-IFMs to form a first selection of part-IFMs and selecting at least a third part-IFM from the first plurality of part-IFMs and a fourth part-IFM from the second plurality of part-IFMs to form a second selection of part-IFMs. The data processing system is further configured to convolve, by respective compute resources in the plurality of compute resources, the set of selections with the given set of filters to compute a set of part-output feature maps, part-OFMs.

According to a third aspect, there is provided a non-transitory computer readable-storage medium comprising computer-executable instructions which, when executed by at least one processor, cause the at least one processor to: generate a set of part-IFMs including a first plurality of part-IFMs which correspond to a first IFM, of the given set of IFMs and a second plurality of part-IFMs which correspond to a second IFM, of the given set of IFMs; group part-IFMs in the set of part-IFMs into a set of selections of part-IFMs, including: select at least a first part-IFM from the first plurality of part-IFMs and a second part-IFM from the second plurality of part-IFMs to form a first selection of part-IFMs, and select at least a third part-IFM from the first plurality of part-IFMs and a fourth part-IFM from the second plurality of part-IFMs to form a second selection of part-IFMs; and convolve, by respective compute resources of the data processing system, the set of selections with the given set of filters to compute a set of part-output feature maps, part-OFMs.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein relate to a method of processing input data for a given layer of a neural network using a data processing system comprising compute resources for performing convolutional computations, the input data comprising a given set of input feature maps (IFMs) and a given set of filters, the method comprising performing a compute-performance-improvement method of processing the input data for the given layer. The method involves generating a plurality of part-IFMs from the set of IFMs and convolving each of the part-IFMs by respective compute resources of the data processing system. By generating, and convolving, more part-IFMs than there are corresponding IFMs, more of the compute resources of the data processing system can be utilized. This increased utilization may improve operating performance by exploiting the ability of the data processing system to run computations in parallel on the plurality of compute resources.

Figure 1:
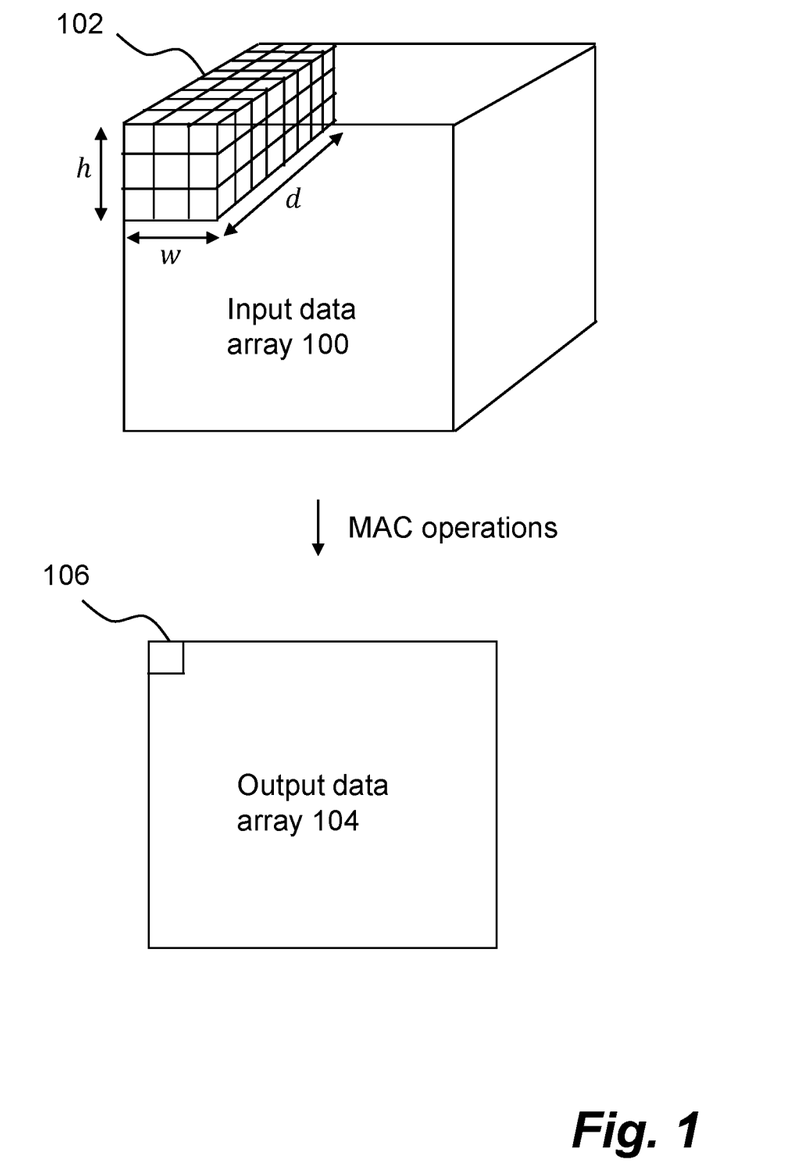
FIG. 1 shows schematically a data processing operation between an input data array and a kernel, to generate an element of an output data array.

FIG. 1 shows an example of a convolution between an input data array 100 and a filter 102, to generate an output data array 104. In the present example, the input data array 100 is a three-dimensional array with multiple channels each comprising a planar array of numerical data elements referred to hereafter as data values. The number of channels is referred to as the depth of the input data array 100. For example, a color image may be represented by a three-dimensional array with different in-plane positions representing different pixels and with the different planar slices representing different color channels. The filter 102 is a further three-dimensional array with the same depth as the input data array 100. The filter 102 comprises d two-dimensional arrays of dimension w×h stacked together. Each of the d two-dimensional arrays will be referred to from herein as kernels. Elements of the filter 102 are referred to as weight values. The input data array 100 comprises d two-dimensional arrays stacked together. Each of the d two-dimensional arrays in the input data array will be referred to as an input feature map (IFM). From herein, an IFM may refer to input data in a first layer of a CNN (an image, for example) or input data into a subsequent layer of a CNN (an output from a previous layer of the CNN, for example). In this example, d=8, w=3, h=3. It will be appreciated that other sizes and shapes of filter are possible without departing from the scope of the invention. For example, input data representing an RGB image may comprise three IFMs per input data array, one IFM for each of the red, green and blue color data. The output data array 104 is a two-dimensional data array.

The convolution is defined such that for a given position of the filter 102 relative to the input data array 100, multiply-accumulate (MAC) operations are performed in which each weight value of the filter 102 is multiplied by a coinciding data value of the input data array 100, and the resulting products are summed to generate an element 106 of the output data array 104. For the given position of the filter 102, a dot product is thereby computed between the filter 102 and a respective subarray of the input data array 100. To generate the entire output data array 104, this dot product operation is performed for each of a predetermined set of positions of the filter 102 relative to the input data array 100, where the predetermined positions are separated by a fixed number of elements, referred to as a stride, in each in-plane direction of the array. In the present example, the stride is one in each direction, so that neighboring positions of the filter 102 relative to the input data array 100 are adjacent to one another. In this example, zero padding is employed such that the input data array 100 is surrounded by a border (not shown) with a width/height of two elements, in which all of the elements are set to zero. This zero padding ensures that the output data array 104 has equal in-plane dimensions to the input data array 100. In other examples, other types of padding may be used. Furthermore, padding may be omitted altogether and/or a stride of greater than one may be used in either in-plane dimension, in which case the output data array 104 would have smaller in-plane dimensions than the input data array 100.

Convolution operations such as that described above are commonly used to generate output feature maps within convolutional layers of a convolutional neural network (CNN), either during training of the CNN or during inference once the CNN has been trained. In a given convolutional layer, each planar slice of a three-dimensional output feature map (OFM) is generated by performing a convolution between a three-dimensional data array comprising a plurality of input feature maps (IFM) and a respective filter, with different OFMs having different sets of filters. An OFM may be indicative of a respective set of features that is pertinent for a given task, for example in computer vision or other image processing tasks. Different filters lead to different sets of features, and although the weight values of a given kernel may be predetermined, for most applications the weight values are learned, possibly with other parameters of the CNN such as a bias, during a training phase. Different sizes of kernel allow for different types of features to be captured from each IFM. Larger kernels may be capable of capturing more expressive features than smaller kernels, though for many applications, features of interest are highly localized, and are therefore able to be captured using small kernels such as kernels with dimensions of 3×3. The generated OFM will typically undergo further processing operations, for example application of an activation function and optionally pooling, before being passed to a subsequent layer of the CNN. The processed OFM may therefore become an IFM for the subsequent layer of the CNN. The subsequent layer may be, for example, another convolutional layer, a deconvolutional layer, or a fully connected layer.

Figure 2:
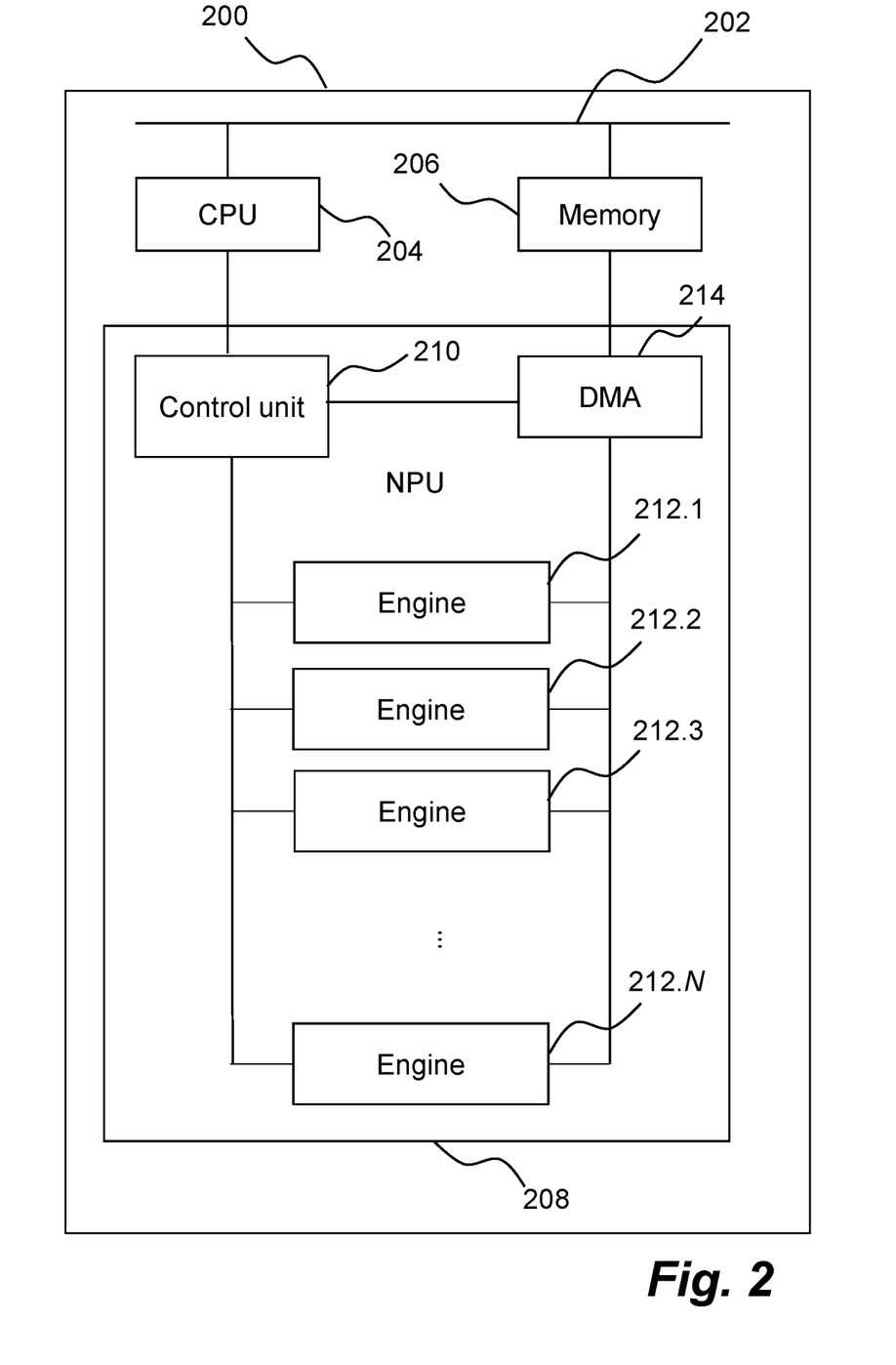
FIG. 2 shows schematically a computing system configured to perform data processing operations in accordance with examples.

FIG. 2 shows an example of a computing system 200 arranged to perform layer processing in accordance with a given neural network architecture. The data processing system 200 incudes a system bus 202 connected to a central processing unit (CPU) 204 and memory 206. The memory 206 includes volatile memory including dynamic random-access memory (DRAM) such as synchronous dynamic random-access memory (SDRAM), as well as non-volatile memory and storage, for example flash memory, a solid-state drive (SSD) and non-volatile random-access memory (NVRAM). The system bus 202 may also be connected to other components not shown in FIG. 2, for example input/output devices, a graphics processing unit (GPU), network interfaces and the like. The data processing system 200 also includes a neural processing unit (NPU) 208, which is a specialized integrated circuit for processing data in accordance with neural network architectures, for example convolutional neural network (CNN) architectures. An NPU may also be referred to as a neural network accelerator (NNA), a convolutional neural network accelerator (CNNA), a machine learning accelerator, or an artificial intelligence accelerator.

The NPU 208 includes a control unit 210, which includes processing circuitry arranged to generate control data for multiple convolution engines, or compute resources, 212.1, 212.2, . . . , 212.N, referred to collectively as convolution engines 212. In the present example, the NPU 208 includes N=16 convolution engines 212, though it will be appreciated that different numbers of convolution engines 212 could be employed without departing from the scope of the invention. The NPU 208 is arranged to retrieve data from the memory 206 using a direct memory access (DMA) 214. The data received from the memory 206 can include, for example, image data or IFM data, along with weight data associated with a given neural network layer, and any other parameters such as bias. The NPU 208 is further arranged to write data such as OFM data to the memory 206 using the DMA 214.

Figure 3:
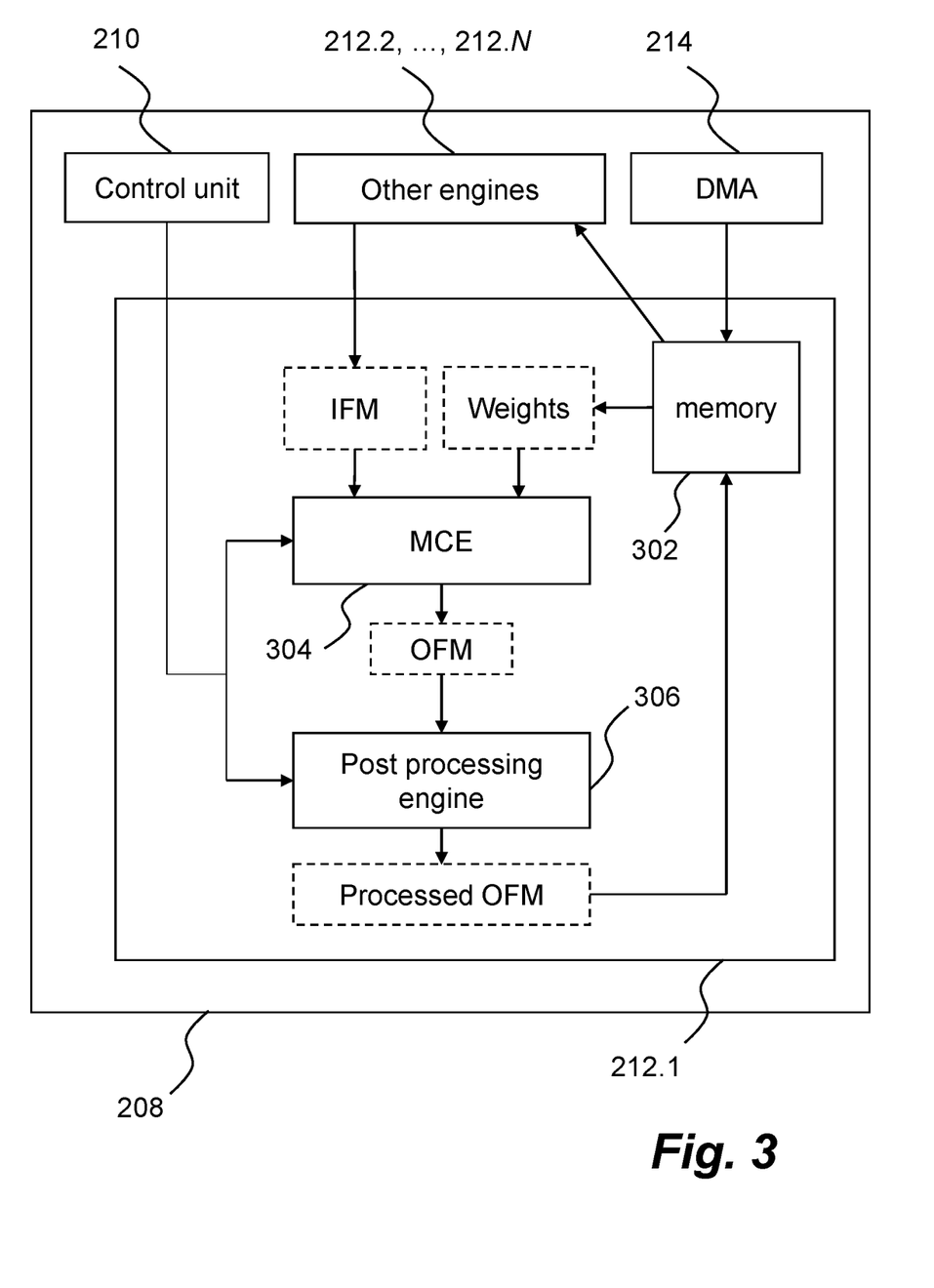
FIG. 3 shows schematically a neural processing unit (NPU) within the computing system of FIG. 2.

FIG. 3 shows the NPU 208 in more detail, including components of the convolution engine 212.1. The other convolution engines 212.2, . . . , 212.N include substantially the same components as the convolution engine 212.1. The convolution engine 212.1 includes memory 302, which in this example includes static random-access memory (SRAM). The convolution engine 212.1 further includes a MAC computation engine (MCE) 304, which is arranged to process data received from the memory 302 and from analogous memories of the other convolution engines 212. The MCE 304 includes components for performing the MAC operations necessary to implement layer processing for a neural network architecture. In particular, the NPU 208 has components arranged for optimized implementation of a convolution (or deconvolution) between an IFM or other data array and a kernel, to generate slices of OFM data as will be described in more detail hereafter.

The convolution engine 212.1 further includes a post compute resource 306 which is arranged to perform additional processing operations on slices of OFM data generated by the MCE 304, including, for example, pooling operations and applying activation functions. The post compute resource 306 can be programmed to perform different operations for different layers within a given neural network, allowing for a broad range of neural network architectures to be implemented. In this example, the post compute resource 306 is arranged to output the slices of processed OFM data to the memory 302 of the convolution engine 212.1. The slices of processed OFM data may be stored in the memory 302 of the convolution engine 212.1 if the memory 302 has sufficient capacity, may be transferred back to the memory 206 of the computing system 200, or may be broadcasted to the other convolution engines 212 for further layer processing.

In an example, the computer system 200 is used to perform inference on a set of IFMs in accordance with a neural network architecture including multiple convolutional layers. Each convolutional layer of the neural network includes multiple filters and therefore implementing each convolutional layer involves multiple convolution operations. The set of IFMs is retrieved from the memory 206, along with weight data corresponding to a filter of a first convolutional layer of the neural network. Both the set of IFMs and the filter are transferred to the memory 302 of the convolution engine 212.1. The convolution engine 212.1 performs a convolution between the set of IFMs and the filter to generate data representing an OFM, which is stored in the memory 302. Each of the convolution engines 212 performs convolutions in this way between the set of IFMs and a respective filter of the first layer, resulting in each of the convolution engines 212 storing data representing multiple OFMs. Once all of the filters of the first layer have been applied, an entire set of processed OFMs is stored between the convolution engines 212. The set of OFMs become a new set of IFMs for the second convolutional layer of the neural network. The convolution engines 212 are arranged to broadcast the stored new set of IFMs to one another such that each convolution engine 212 can access the entire set of new IFM for the second layer. Weight data corresponding to filters of the second layer is then transferred from the memory 206 to the convolution engines 212, and each of the convolution engines 212 performs convolutions between the new set of IFMs and respective filters of the second layer. This procedure is repeated for subsequent convolutional layers of the neural network. When the final convolutional layer has been implemented, the resulting processed set of OFMs is transmitted to the memory 206 of the computing system 200 or the on-board memory of the NPU 208 (including the memory 302). A further layer of the neural network may follow the convolutional layers, for example a deconvolutional layer, a fully connected layer, or an output layer. Although in this example the layers of the neural network are processed one layer at a time, in other examples portions of multiple layers may be processed at the same time, resulting in so-called fused layer processing.

Figure 4:
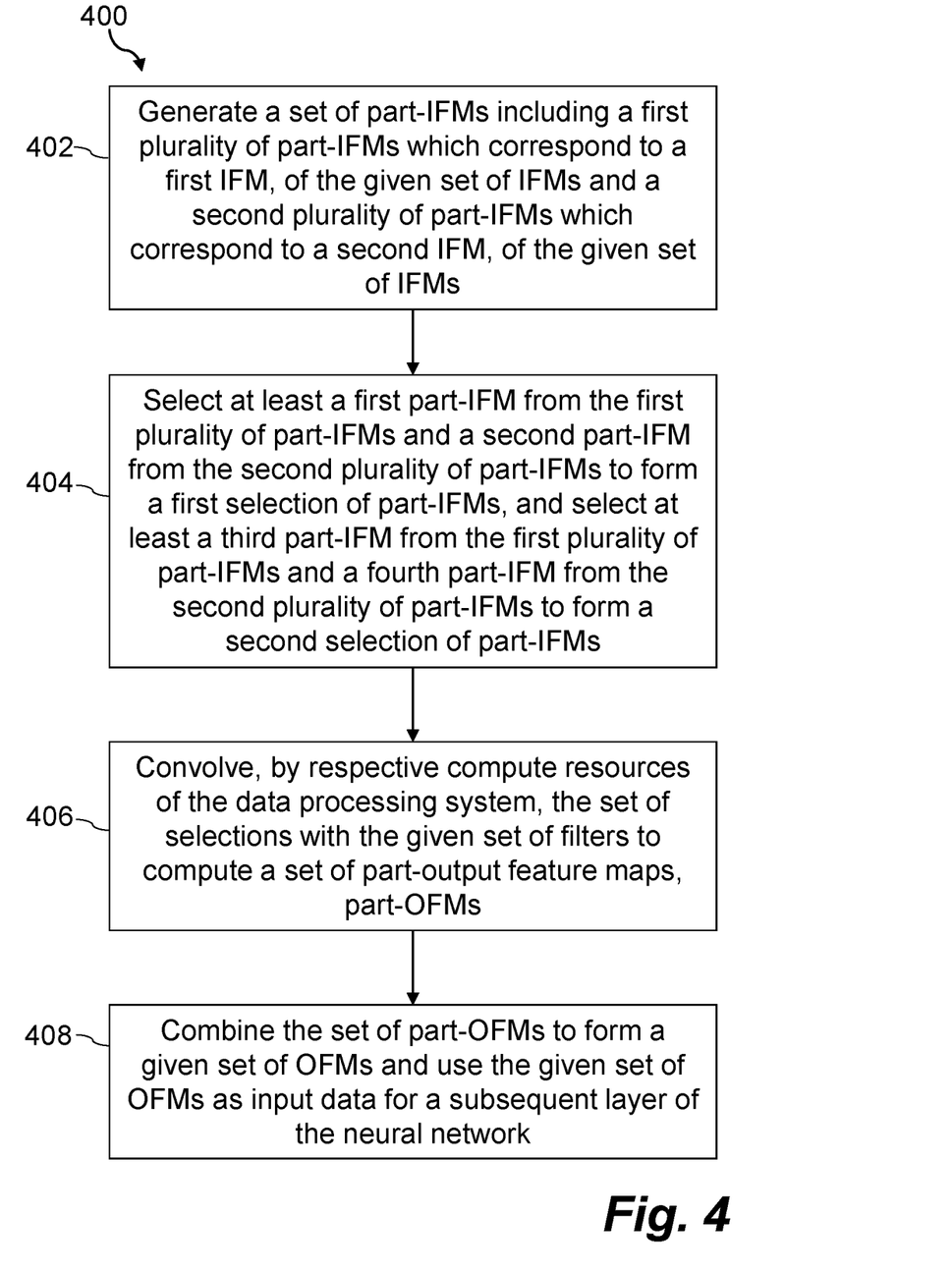
FIG. 4 is a flow chart illustrating a method for processing data according to examples.

FIG. 4 illustrates a method 400 of processing input data for a given layer of a neural network using a data processing system comprising compute resources for performing convolutional computations, the input data comprising a given set of input feature maps (IFMs) and a given set of filters. The method 400 comprises performing a compute-performance-improvement method of processing the input data for the given layer. The data processing system may be the computer system 200 shown in FIG. 2. In this example, the compute resources are the convolution engine 212.

The processing of the input data for the given layer involves computing a set of OFMs by convolving a set of IFMs with a set of filters, as discussed above. The IFMs are data arrays comprising elements that represent property values of an image. The number of filters in the set of filters is related to the number of OFMs produced. In a standard convolution, the number of filters is equal to the number of OFMs produced. This is modified in the method 400 to take into account compute resources that are not utilized in a standard convolution. For example, because each compute resource is configured to compute one OFM by convolving a set of IFMs with one filter from the set of filters, an underutilization of the compute resources may result when the number of filters is less than the number of compute resources available for processing. For example, there may be 8 filters in a set of filters and 16 compute resources in the data processing system. Computing the convolutional layer using a standard convolution will result in 8 of the 16 compute resources being used to process the convolutional layer, resulting in a 50% utilization of the available compute resources.

At block 402, the method 400 involves generating a set of part-IFMs including a first plurality of part-IFMs which correspond to a first IFM, of the given set of IFMs and a second plurality of part-IFMs which correspond to a second IFM, of the given set of IFMs. As discussed above, the data processing system comprises compute resources. The compute resources may comprise a plurality of convolution engines, such as in the computer system 200 shown in FIG. 2. Each of the convolution engines is configured to compute one OFM by convolving a set of IFMs with a filter from the set of filters.

Generating the first and second pluralities of part-IFMs may be done dynamically by the data processing system. To do this, the data processing system may be configured to determine a number of OFMs in the set of OFMs and a number of compute engines available for processing. In this case, the data processing system may determine that the number of OFMs in the set of OFMs is less than the number of available compute engines. The data processing system may then generate a first set of part-IFMs based on the determined number of compute engines available for processing. For example, a data processing system may comprise 16 compute resources and a layer of a convolutional neural network may have eight OFMs. In this case, the data processing system may generate two part-IFMs corresponding to the first IFM, so that each filter convolves each of the part-IFMs to produce 16 corresponding part-OFMs. In this way, all of the available compute resources may be utilized to process the layer of the neural network.

In another example, a data processing system may comprise 32 compute resources, while a layer of a convolutional neural network may comprise 14 filters and 14 IFMs, generating 14 OFMs. In this case, the efficiency with which the compute resources of the data processing system processes the convolutional neural network may be improved by generating 28 part-IFMs. While not all of the compute resources of the data processing system will be utilized, the efficiency of the data processing system can be improved from $14/32$ of the maximum possible efficiency to $28/32$, by generating the part-IFMs from the IFMs.

In general, when there are fewer filters than compute resources available for processing, it may be possible to generate a plurality of part-IFMs so that convolving the plurality of part-IFMs with the set of filters results in a greater utilization of the compute resources. The number of part-IFMs in the first set of part-IFMs need not be a power of two. For example, there may be three, five, seven and so on part-IFMs in the first set of part-IFMs. The number of part-IFMs generated may depend on the number of filters in the set of filters and the number of compute resources available for processing.

How the part-IFMs in the first and second pluralities of part-IFMs are generated may depend on certain properties of the convolutional layer. For example, if each kernel is of dimension N×M, where N and M are both positive integers greater than one, then a first part-IFM in the first plurality of part-IFMs may comprise one or more elements that are also in a second part-IFM in the first plurality of part-IFMs. That is, there may be some overlap between part-IFMs to ensure that a subsequent convolution results in the expected part-OFMs, based on if the first IFM is convolved with the filters. This is due to the nature of convolution when the kernel is of dimension N×M because an element in a data array representing the OFM is the result of MAC operations on a plurality of elements in the data array representing the IFM. A single element in a data array representing the IFM may be involved in the calculations of more than one element in the data array representing the OFM. Consequently, these elements may be present in more than one of the part-IFMs in a given plurality of part-IFMs.

However, if each kernel in a filter in the set of filters is of dimension 1×1, then the elements of each part-IFM in a plurality of part-IFMs may be independent of one another, i.e. each data array representing a part-IFM may be a disjoint subarray of the array representing the corresponding IFM. In any case, each data array representing a part-IFM can be considered as a subarray of the data array representing the corresponding IFM. Additionally, the composition and/or dimension of the generated part-IFMs may also depend on at least one of a stride and padding used by the convolutional neural network model.

A data array representing a first part-IFM in the first plurality of part-IFMs may have the same dimension as a data array representing a second part-IFM in the first plurality of part-IFMs. In one example, every data array representing each part-IFM in the first plurality of part-IFMs may have the same dimension. For example, a first plurality of part-IFMs may comprise four part-IFMs corresponding to the first IFM, wherein each of the part-IFMs is of the same dimension and approximately corresponds to a quarter of the data representing first IFM.

In another example, a dimension of a data array representing a part-IFM in the first plurality of part-IFMs may have a different dimension from a data array representing a second part-IFM in the first plurality of IFMs. For example, consider the case where a first IFM is represented by a two-dimensional data array of dimension 10×10, the set of filters comprises four filters and the data processing system comprises 12 available compute resources. In this situation, utilization of the compute resources can be increased if three part-IFMs are generated corresponding to the first IFM. In this case, the three part-IFMs may be generated with dimensions 6×6, 6×6 and 6×10 because partitioning the data array representing the first IFM into three part-IFMs of equal dimension may be difficult to achieve.

Each part-IFM in the second plurality of part-IFMs has the same dimension as corresponding part-IFMs in the first plurality of part-IFMs, so that a number of part-IFMs in the second plurality of part-IFMs is equal to a number of part-IFMs in the first plurality of part-IFMs. For example, if there is a part-IFM in the first plurality of part-IFMs corresponding to the upper-left 3×3 elements of the first IFM, there will be a corresponding part-IFM in the second plurality of part-IFMs corresponding to the upper-left 3×3 elements of the second IFM. This process of generating part-IFMs for respective IFMs in the input layer may be repeated for all the IFMs.

The first and second pluralities of part-IFMs may be generated by manipulating a memory address of the first IFM. In this case, this may result in the first IFM being identified by the data processing system as the first plurality of part-IFMs. Accordingly, subsequent convolution operations will take place on the identified first plurality of part-IFMs. Other examples are possible. In one example, the control unit 210 may generate sets of part-IFMs based on a number of OFMs in the set of OFMs and a number of compute resources available for processing. The number of OFMs and compute resources may be determined by the control unit 210. In any case, generating the first set of part-IFMs does not introduce additional data into the neural network model and so does not increase memory usage.

At block 404, the method 400 involves grouping part-IFMs in the set of part-IFMs into a set of selections of part-IFMs. The grouping includes selecting at least a first part-IFM from the first plurality of part-IFMs and a second part-IFM from the second plurality of part-IFMs to form a first selection of part-IFMs, and selecting at least a third part-IFM from the first plurality of part-IFMs and a fourth part-IFM from the second plurality of part-IFMs to form a second selection of part-IFMs.

The grouping may be based on which of the part-IFMs are to be convolved in order to produce a given part-OFM. For example, a standard convolution may produce a given OFM by convolving a set of IFMs with a given filter. An upper-left quarter of the OFM may be the result of convolving corresponding upper-left quarters of each IFM in the set of IFMs, with the given filter. Therefore, the part-IFMs corresponding to an upper-left quarter of each IFM in the set of IFMs may be grouped, such that convolving the set of part-IFMs results in the upper-left quarter of the corresponding OFM.

The grouping may involve identifying corresponding part-IFMs in the first and second pluralities of part-IFMs. For example, a first part-IFM corresponding to a subarray comprising the first 3×3 elements of the first IFM may be grouped with a second part-IFM corresponding to a subarray comprising the first 3×3 elements of the second IFM.

The grouping may be achieved by manipulating memory addresses of the first and second part-IFMs. For example, the memory addresses may be manipulated so that the first and second part-IFMs are identified as a sublayer of the layer of IFMs. Alternatively, the control unit 210 may be configured to group the first and second part-IFMs so that they are received together by respective compute resources for convolution with a respective filter.

Selecting the third part-IFM and the fourth part-IFM to form the second selection of part-IFMs may be done in correspondence with the forming of the first selection of part-IFMs. The process of grouping part-IFMs from the first and second set of part-IFMs may be repeated until all corresponding part-IFMs in the first and second set of part-IFMs are grouped into selections of part-IFMs.

At block 406, the method 400 involves convolving, by respective compute resources of the data processing system, the set of selections with the given set of filters to compute a set of part-output feature maps (part-OFMs). For instance, convolving the first selection of part-IFMs with each filter in the set of filters results in a first set of part-OFMs, wherein each part-OFM in the first set of part-OFMs is the result of convolving the first selection of part-IFMs with a respective filter. The grouping of part-IFMs into the first selection of part-IFMs at block 404 is determined so that each resulting data array representing each part-OFM corresponds to a disjoint subset of the data array representing the corresponding OFM. In this way, when every selection of part-IFMs is convolved with the set of filters, the resulting part-OFMs are functionally equivalent to the OFMs that would have resulted from convolving the IFMs.

The result of this is that more of the data processing system's compute resources can be utilized to compute layers of neural networks. For instance, if a convolution is performed on the IFMs, rather than the part-IFMs, the number of OFMs produced will be equal to the number of filters in the set of filters, because the result of convolving a set of IFMs with a single filter is a single OFM. However, according to the method 400, the number of part-OFMs produced by the convolution process is equal to the number of part-IFMs per IFM multiplied by the number of filters in the set of filters. This can be stated mathematically as:

$$N_O = N_f * N_{PI} \qquad \text{Equation 1}$$

Where $N_O$ is the number of part-OFMs, $N_f$ is the number of filters in the set of filters and $N_{PI}$ is the number of part-IFMs per IFM in a single convolutional layer.

Thus, choosing an appropriate number of part-IFMs per IFM determines the number of part-OFMs produced, and therefore how many of the compute resources are utilized in the computation of a convolutional layer in a convolutional neural network. Equation 1 can be utilized in order to find the maximum possible No for the number of available compute resources, and therefore how many part-IFMs should be generated for each IFM. This could be done by the data processing system itself, or computed using software on a device comprising the data processing system. For example, the data processing system may determine that if the given set of IFMs were to be convolved with the given set of filters, a set of OFMs comprising a given number of OFMs would be computed. If the given number of OFMs is less than or equal to half of the given number of convolution engines, the data processing system determines that the set of part-OFMs can comprise a number of part-OFMs which is more than the given number of OFMs and less than or equal to the given number of convolution engines.

At block 408, the method 400 involves combining the set of part-OFMs to form a given set of OFMs, and using the given set of OFMs as input data for a subsequent layer of the neural network. As discussed above with respect to block 406, data arrays representing each part-OFM are disjoint subsets of the data array representing the corresponding OFM. In some cases, the output of a convolutional layer may be an input for a subsequent convolutional layer or a pooling layer, for example. In this case, it may be desired for the output produced at block 406 to appear as if the convolutional layer had not been processed by first generating part-IFMs. An example of this is when a subsequent layer of a convolutional network expects a certain number of OFMs from a previous layer as input to the subsequent layer. This may be of use in a convolutional neural network that has already been trained where more complex processes in subsequent layers, such as channel shuffling or further convolutions, expect input data arrays of a certain dimension.

The process of forming the set of OFMs may correspond to generating the pluralities of part-IFMs. For example, memory addresses of the part-OFMs may be manipulated so that a subsequent layer of a convolutional neural network identifies the part-OFMs as the corresponding OFMs. Alternatively, the control unit 210 may be configured to form the set of OFMs.

In some cases, it may not be necessary to form the set of OFMs from the part-OFMs. Depending on a number of filters in a set of filters in a subsequent layer, the method 400 may be repeated, such as if the number of filters in the subsequent layer is less than the number of compute resources available for processing. This may be determined dynamically, as the data is passed between layers of the convolutional neural network, or may be determined before processing begins on the first convolutional layer.

In some examples, the compute-performance-improvement method 400 may be performed selectively. In this case, it is possible to perform a further method, different to the compute-performance-improvement method 400, to process further data for a further neural network layer using the data processing system, in dependence on the characteristics of the given and further network layers respectively. For example, the method 400 may not be applied to each layer of a convolutional neural network, but can be implemented selectively, based on characteristics of the further network layers. These characteristics may comprise the number of OFMs resulting from a further network layer, for example.

In one example, the further layer comprises a further set of IFMs and a further set of filters. The data processing system may determine that if the further set of IFMs were to be convolved with the further set of filters, a further set of OFMs comprising a further number of OFMs would be computed. If the further number of OFMs is more than half of the given number of convolution engines, the further set of IFMs may be convolved with the first set of filters to compute the further set of OFMs. Each of the further set of OFMs may be computed in a different one of the convolution engines.

The method 400 provides an efficient method of processing a layer of a neural network by increasing a utilization of available compute resources. In addition, because the part-IFMs are subarrays of respective IFMs, and the part-IFMs are convolved with the same set of filters, the method 400 does not increase memory usage over a standard convolutional layer of a neural network. It should be noted that the method 400 is described with reference to a first and second IFM. However, the method 400 is applicable to layers comprising any number of IFMs greater than one.

Figure 5A:
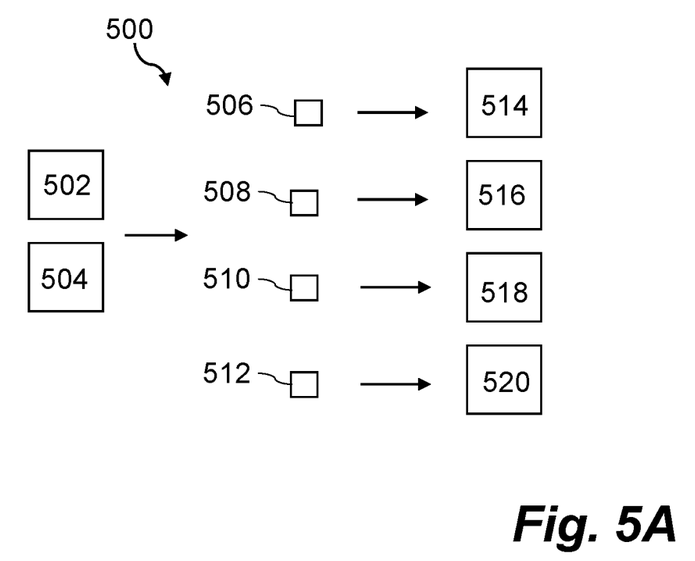
FIG. 5A is a convolutional layer of a convolutional neural network according to an example.

An example of the method 400 will now be discussed with reference to FIGS. 5A-5C. FIG. 5A is an example convolutional layer of a convolutional neural network 500, with a set of IFMs 502 and 504, a set of filters 506-512, and a set of OFMs 514-520. Each filter 506-512 comprises two kernels used to convolve each IFM 502 and 504. FIG. 5A shows the result of convolving the set of IFMs 502 and 504 with the set of filters 506-512 to produce the set of OFMs 514-520. In this case, the OFM 514 results from convolving the IFMs 502 and 504 with the filter 506, the OFM 516 results from convolving the IFMs 502 and 504 with the filter 508, the OFM 518 results from convolving the IFMs 502 and 504 with the filter 510, and the OFM 520 results from convolving the IFMs 502 and 504 with the filter 512.

Figure 5B:
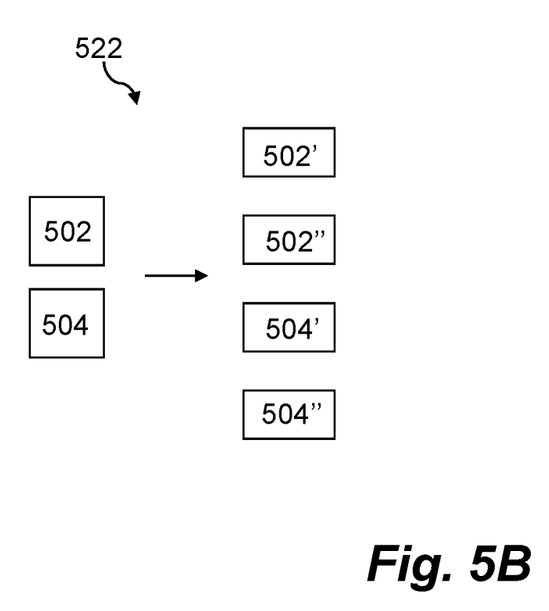
FIG. 5B is an example first operation on a convolutional layer of the convolutional neural network of FIG. 5A.
Figure 5C:
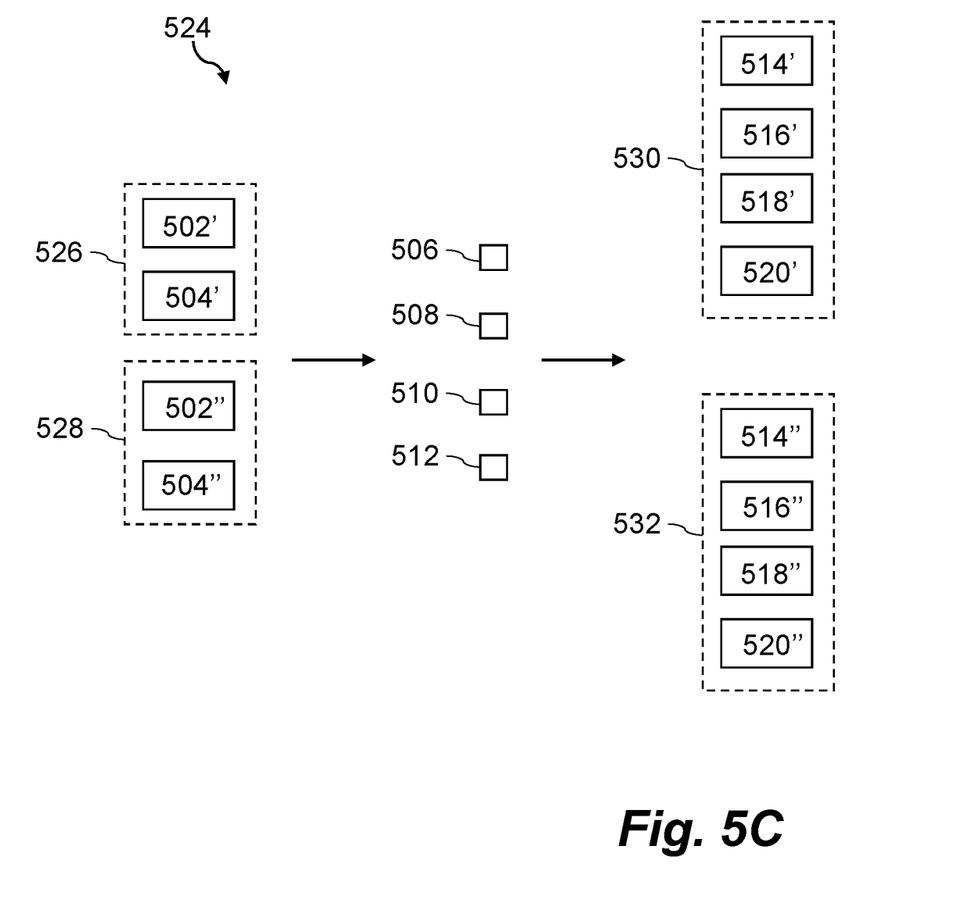
FIG. 5C is an example second operation on the convolutional layer of the convolutional neural network of FIG. 5A.

In the example shown in FIGS. 5A-5C, the data processing system (not shown) comprises compute resources comprising at least eight convolution engines. Therefore, in the example shown in FIG. 5A, only four out of the eight compute engines will be used to process the convolutional layer 500. Processing the convolutional layer can be made more efficient if more of the compute engines can be utilized to process the convolutional layer.

FIG. 5B shows an example of generating 522 a set of part-IFMs 502', 502", 504', 504" corresponding to IFMs 502 and 504. As discussed above, the data processing system comprises at least eight convolution engines. Therefore, in the example shown in FIG. 5B, the two IFMs 502 and 504 are partitioned into four part-IFMs 502', 502", 504', 504" so that eight part-OFMs will be produced by convolving each part-IFM with the set of filters, and consequently, all eight of the compute engines are utilized in the convolution procedure. The dimension of each part-IFM 502', 502", 504', 504" depends on the dimension of the kernels in the filters 506-512. For example, if the kernels in the filters 506-512 are of dimension 1×1, then the part-IFMs 502', 502", 504', 504" may represent disjoint subarrays of the respective IFMs 502 and 504. In an example, the part-IFM 502' may represent the upper half of the elements in the IFM 502, the part-IFM 502" may represent the lower half of the elements in the IFM 502, the part-IFM 504' may represent the upper half of the elements in the IFM 504, and the part-IFM 504" may represent the lower half of the elements in the IFM 504.

Other partitionings are possible. For example, the part-IFMs 502', 502", 504' and 504" may correspond to vertical halves of the respective IFMs 502 and 504. In another example, the part-IFMs 502' and 504' are of a different dimension from the part-IFMs 502" and 504".

If the kernels in the filter 506-512 are of dimension N×M, where N and M are positive integers greater than one, then at least one element from the part-IFM 502' will be the same as an element from the part-IFM 502" in order to produce the correct part-OFMs. In the case where the IFM 502 is represented by a data array of dimension 16×16, the part-IFM 502' may correspond to the upper 9×16 elements of the IFM 502, while the part-IFM 502" may correspond to the lower 9×16 elements of the IFM 502. In this case, the bottom row of the part-IFM 502' will be the same as the top row of the part-IFM 502". As discussed above, other partitionings are possible.

For the part-IFMs 502', 502", 504', 504" to be convolved to produce the expected part-OFMs, the part-IFMs 502', 502", 504', 504" need to be grouped appropriately prior to convolution. FIG. 5C is an example convolutional layer of a convolutional neural network 524 wherein the part-IFMs 502', 502", 504', 504" are grouped to form selections of part-IFMs 526 and 528. The selection of part-IFMs 526 comprises the part-IFMs 502', 504' corresponding to the first and second IFMs 502 and 504 respectively, while the selection of part-IFMs 528 comprises the part-IFMs 502", 504" corresponding to the first and second IFMs 502 and 504 respectively. The data processing system may then treat the first and second selections of part-IFMs 526, 528 as separate input layers of data.

The selections of part-IFMs 526, 528 are then convolved, separately, by the filters 506-512 to produce the two selections of part-OFMs 530 and 532, respectively comprising part-OFMs 514', 516', 518', 520' and 514", 516", 518", 520". The part-OFMs 514', 514" correspond to the OFM 514, the part-OFMs 516', 516" correspond to the OFM 516, the part-OFMs 518', 518" correspond to the OFM 518, and the part-OFMs 520', 520" correspond to the OFM 520. Specifically, the part-OFMs 514', 516', 518', 520' are produced by convolving the selection of part-IFMs 526 with respective filters 506-512, and the part-OFMs 514", 516", 518", 520" are produced by convolving the selection of part-IFMs 528 with respective filters 506-512. In this way, it can be appreciated that the selections of OFMs 530, 532 are functionally equivalent to the OFMs 514-520 in FIG. 5A.

It should be noted that the method 400 may be performed by a data processing system having the plurality of compute resources 212 and storage 206 of the computing device 200 shown in FIG. 2. For example, the storage 206 stores data according to a layer of a neural network, the data comprising a set of input feature maps, IFMs, and a set of filters, and wherein the storage element is coupled to the data processing system. The data processing system is configured to generate a set of part-IFMs including a first plurality of part-IFMs which correspond to a first IFM, of the given set of IFMs and a second plurality of part-IFMs which correspond to a second IFM, of the given set of IFMs. The data processing system is further configured to group part-IFMs in the set of part-IFMs into a set of selections of part-IFMs, including: selecting at least a first part-IFM from the first plurality of part-IFMs and a second part-IFM from the second plurality of part-IFMs to form a first selection of part-IFMs, and selecting at least a third part-IFM from the first plurality of part-IFMs and a fourth part-IFM from the second plurality of part-IFMs to form a second selection of part-IFMs. The data processing system is further configured to convolve, by respective compute resources, the set of selections with the given set of filters to compute a set of part-output feature maps, part-OFMs.

As discussed above, the data processing system may be a neural data processing system configured to process data representing a layer of a convolutional neural network. The compute resources may comprise a plurality of convolution engines. The data processing system may be further configured to increase a number of convolution engines, of said plurality of convolution engines, used to process the input data for the given layer, compared to a number of convolution engines which would be used if the given set of IFMs were to be convolved with the given set of filters. Additionally, or alternatively, the data processing system may be configured to modify memory addresses associated with the first IFM to generate the first plurality of part-IFMs. If this is the case, the data processing system may also be configured to modify memory addresses associated with the first part-IFM from the first plurality of part-IFMs and the second part-IFM from the second plurality of part-IFMs to form the first selection of part-IFMs. The data processing system may be further configured to combine the set of part-OFMs to form a given set of OFMs, and use the given set of OFMs as input data for a subsequent layer of the neural network.

Figure 6:
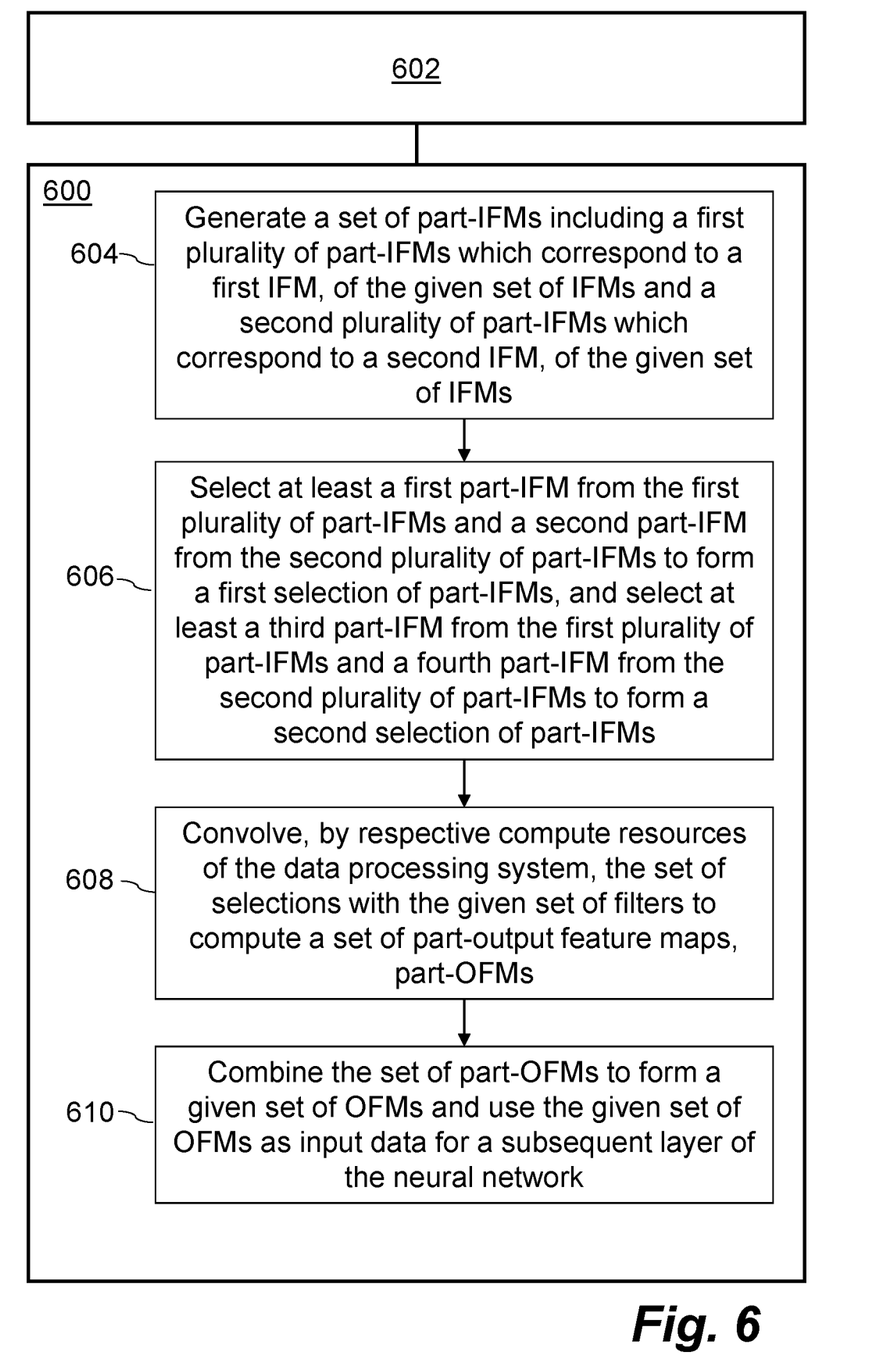
FIG. 6 is a computer-readable storage medium according to an example.

FIG. 6 shows a non-transitory computer-readable storage medium 600 comprising computer-executable instructions 604-610. The computer-executable instructions 604-610 when executed by a processor 602, cause the processor 602 to perform a method 400. The method 400 includes, at a first block 604, generating a set of part-IFMs including a first plurality of part-IFMs which correspond to a first IFM, of the given set of IFMs and a second plurality of part-IFMs which correspond to a second IFM, of the given set of IFMs. At a second block 606, the method involves selecting at least a first part-IFM from the first plurality of part-IFMs and a second part-IFM from the second plurality of part-IFMs to form a first selection of part-IFMs, and select at least a third part-IFM from the first plurality of part-IFMs and a fourth part-IFM from the second plurality of part-IFMs to form a second selection of part-IFMs. At block 608, the method involves convolving, by respective compute resources of the data processing system, the set of selections with the given set of filters to compute a set of part-output feature maps, part-OFMs. At block 610, the method involves combining the set of part-OFMs to form a given set of OFMs and use the given set of OFMs as input data for a subsequent layer of the neural network.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of improving utilization of compute resources when processing input data for a given layer of a neural network using a data processing system comprising: compute resources, the compute resources comprising a plurality of convolution engines for performing convolutional computations, the input data comprising a given set of input feature maps derived from one or more images, IFMs, and a given set of filters, the method comprising performing a compute-performance-improvement method of processing the input data for the given layer including:

generating a set of part-IFMs including a first plurality of part-IFMs which correspond to a first IFM, of the given set of IFMs and a second plurality of part-IFMs which correspond to a second IFMV, of the given set of IFMs;

grouping part-IFMs in the set of part-IFMs into a set of selections of part-IFMs, including:
  selecting at least a first part-IFM from the first plurality of part-IFMs and a second part-IFM from the second plurality of part-IFMs to form a first selection of part-IFMs; and
  selecting at least a third part-IFM from the first plurality of part-IFMs and a fourth part-IFM from the second plurality of part-IFMs to form a second selection of part-IFMs; and convolving, by respective compute resources of the data processing system, the set of selections with the given set of filters to compute a set of part-output feature maps, part-OFMs, wherein:
  if the given set of IFMs were to be convolved with the given set of filters, a set of OFVs comprising a given number of OFMs would be computed,
  the given number of OFMs is less than or equal to half of a given number of convolution engines of the plurality of convolution engines, and
  the set of part-OFMs comprises a number of part-OFMs which is more than the given number of OFMs and less than or equal to the given number of convolution engines.

2. A method according to claim 1, comprising:
combining the set of part-OFMs to form a given set of OFMs; and
using the given set of OFMs as input data for a subsequent layer of the neural network.

3. A method according to claim 1, wherein the method increases a number of convolution engines, of said plurality of convolution engines, used to process the input data for the given layer, compared to a number of convolution engines which would be used if the given set of IFMs were to be convolved with the given set of filters.

4. A method according to claim 1, wherein the compute-performance-improvement method comprises computing each part-OFM of the set of part-OFMs in a different one of the convolution engines.

5. A method according to claim 4, comprising performing the compute-performance-improvement method selectively, and performing a further method, different to the compute-performance-improvement method, to process further data for a further neural network layer using the data processing system, in dependence on the characteristics of the given and further network layers respectively.

6. A method according to claim 5, wherein:
the further layer comprises a further set of IFMs and a further set of filters;
if the further set of IFMs were to be convolved with the further set of filters, a further set of OFMs comprising a further number of OFMs would be computed; and
the further number of OFMs is more than half of the given number of convolution engines, and
wherein the further method comprises:
  convolving the further set of IFMs with the first set of filters to compute the further set of OFMs; and
  computing each OFM of the further set of OFMs in a different one of the convolution engines.

7. The method of claim 1, wherein the plurality of convolutional engines are comprised in a neural processing unit.

8. The method of claim 1, wherein the generating the set of part-IFMs comprises modifying memory addresses of the first and second IFMs.

9. The method of claim 8, wherein the grouping the part-IFMs in the set of part-IFMs into a set of selections of part-IFMs comprises further modifying the memory addresses of the first, second, third and fourth part-IFMs.

10. The method of claim 1, wherein at least one element of data in the first part-IFM is also in the third part-IFM.

11. A non-transitory computer-readable medium comprising a set of instructions, which, when executed by a processor, cause the processor to perform the method of claim 1.

12. A data processing system comprising:
compute resources comprising a plurality of convolution engines; and
storage for storing data according to a layer of a neural network, the data comprising a set of input feature maps derived from one or more images, IFMs, and a set of filters, wherein the storage is coupled to the compute resources,
wherein the data processing system is configured to:
generate a set of part-IFMs including a first plurality of part-IFMs which correspond to a first IFM, of the given set of IFMs and a second plurality of part-IFMs which correspond to a second IFM, of the given set of IFMs;
group part-IFMs in the set of part-IFMs into a set of selections of part-IFMs, including:
selecting at least a first part-IFM from the first plurality of part-IFMs and a second part-IFM from the second plurality of part-IFMs to form a first selection of part-IFMs; and
selecting at least a third part-IFM from the first plurality of part-IFMs and a fourth part-IFM from the second plurality of part-IFMs to form a second selection of part-IFMs; and
convolve, by respective compute resources, the set of selections with the given set of filters to compute a set of part-output feature maps, part-OFMs, wherein:
if the given set of IFMs were to be convolved with the given set of filters, a set of OFMs comprising a given number of OFMs would be computed,
the given number of OFMs is less than or equal to half of a given number of convolution engines of the plurality of convolution engines, and
the set of part-OFMs comprises a number of part-OFMs which is more than the given number of OFMs and less than or equal to the given number of convolution engines.

13. The data processing system of claim 12, wherein the data processing system is a neural data processing system.

14. The data processing system of claim 12, wherein the data processing system is further configured to increase a number of convolution engines, of said plurality of convolution engines, used to process the input data for the given layer, compared to a number of convolution engines which would be used if the given set of IFMs were to be convolved with the given set of filters.

15. The data processing system of claim 12, further comprising a control unit configured to modify memory addresses associated with the first IFM to generate the first plurality of part-IFMs.

16. The data processing system of claim 15, wherein the control unit is further configured to modify memory addresses associated with the first part-IFM from the first plurality of part-IFMs and the second part-IFM from the second plurality of part-IFMs to form the first selection of part-IFMs.

* * * * *